March 17, 1953  F. A. PURDY  2,631,374
APPARATUS FOR FITTING CLOTHES
Filed Jan. 30, 1947
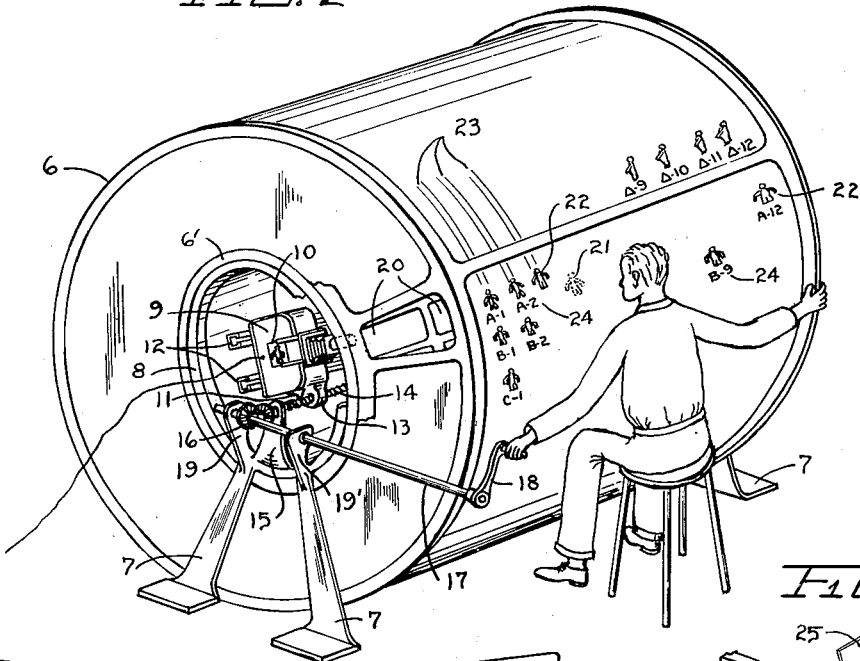
FIG. 2
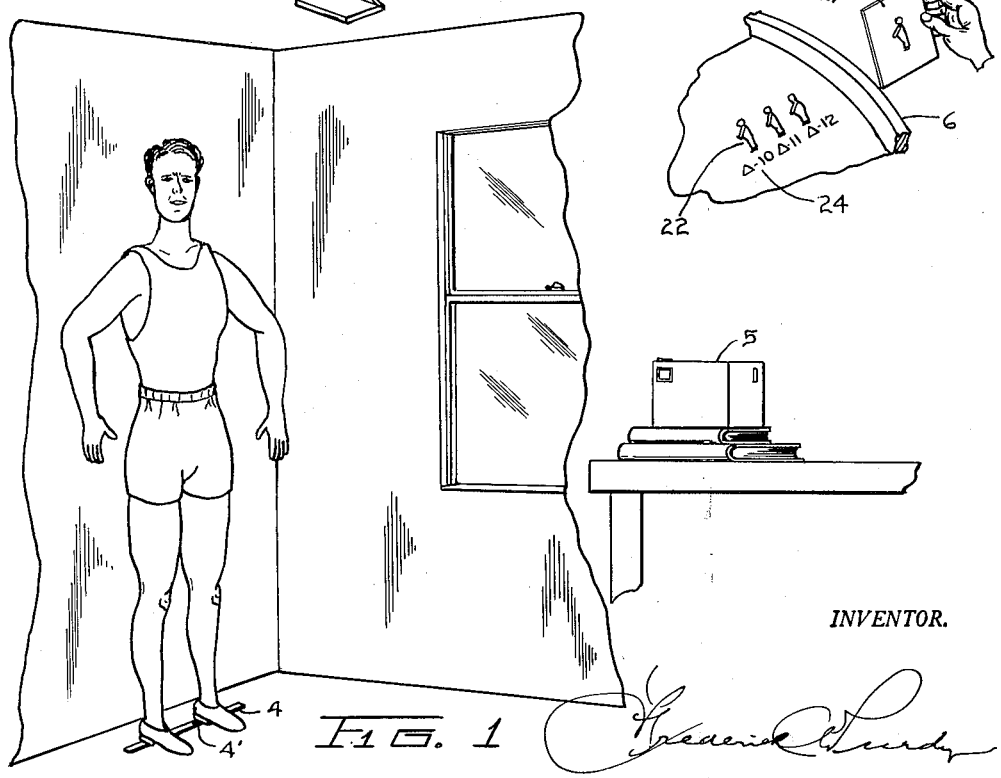
FIG. 3
FIG. 1
INVENTOR.

Patented Mar. 17, 1953

2,631,374

UNITED STATES PATENT OFFICE 2,631,374

APPARATUS FOR FITTING CLOTHES

Frederick A. Purdy, Scarsdale, N. Y.

Application January 30, 1947, Serial No. 725,193

5 Claims. (Cl. 33—2)

My invention relates to improvements in processes for determining by photograph fits of suits, dresses, overcoats, hats, shoes, and other articles of wear, embraced in the general term "clothing."

Objects of the invention are: directness in assigning appropriate clothing-patterns to the person photographed, convenience in relating the person's size or other characteristics to a gauge reproduced with the photograph, convenience in setting the gauge for the photograph, simplicity and economy in manufacture of the gauge, and accuracy through placing the gauge substantially within a plane lying through the middle line of the body of the person photographed. Other objects will appear in the development of the description.

The accompanying drawings represent a preferred form of the invention. Figure 1 is a perspective view of a person to be fitted, of a floor-gauge above which the person stands, and of a camera positioned to photograph the person and the gauge. Figure 2 is a perspective view of a cylindrical carrier with a series of pattern-profiles mounted upon its perimeter, the perimeter being of material permeable by light, and of a lantern-slide projector within its hub by which to project upon the perimeter an image from the photograph, which image may be brought into register with a profile that represents the clothing-pattern of the person photographed. Figure 3 shows an alternative method of manually registering, directly with profiles or pictures, the photograph or an enlarged or reduced duplicate thereof.

The word "photograph" is used in the dictionary sense: "an image produced on a sensitized surface by the action of light." Within this sense the negative-film is a photograph, as is also the "print."

In Figure 1, the person to be photographed stands above the floor-gauge 4. This floor-gauge, in the preferred form illustrated, is a strip of material of definite length such as an 18-inch rule. It is placed substantially at right angles to the lines of sight from the camera, that is, in a plane substantially parallel to a plane through the circumference of the camera-lens. For a front view of the person with his feet pointing toward the camera, the floor-gauge lies at right angles substantially to the longer dimension of the feet, and is positioned substantially in a plane vertically through the middle line of the body, at a prescribed point below the instep; for a side view, the longer dimension of the person's feet is parallel, substantially, to the gauge, with the gauge substantially in the middle line between the feet. Markings 4' on the gauge show a distance of separation of feet for the front view to afford a clear indication of the inside height of legs.

A gauge set in a plane through the body contributes to accuracy in translation as against a gauge set beyond the body as on a wall. It holds its validity through a range of error in the positioning of the camera at a distance from the subject. If the camera were set two inches short of a prescribed eight-foot distance, the lines of sight from the camera passing the shoulders of the subject nine inches to either side of his middle line would register on a wall-gauge (on a wall a foot beyond the subject) more than half an inch wider in the shoulders than if the distance of eight feet were accurately adhered to. This would produce a circumferential discrepancy of more than an inch and a quarter in the pattern-cutting dimension.

The camera 5 is set on a table, preferably adjusted by books or papers to a prescribed height, such as three feet. It is preferably set as a prescribed distance from the gauge, such as eight feet. (A standardized distance may be limited to that practical in living quarters that are not spacious.) The photographs are produced by the camera and auxiliary devices of the usual character. They may be transmissible by mail or otherwise to the clothing-factory, or to an intermediate agency, for assignment, to the person photographed, of a pattern-symbol representing a clothing-pattern that provides for his fit. The assignment of this symbol is made through means illustrated in Figure 2.

In Figure 2 the carrier 6 is supported from the floor by the supports 7 fast to a cylindrical bearing 8 upon which turns the carrier-hub 6', turning friction being minimized by ball-bearings not shown. Within the cylinder formed by the bearing 8 is a lantern-slide projector 9 (hereinafter called "projector"). This projector is of the usual design by which a light is passed through a pictured film to project an image from the film upon a surface, and by which a change in the relative positions of lenses will change the size of the image projected. Into the slide of the projector is inserted the negative-film photograph 10 of the person to be fitted, so that his image, together with that of the gauge, is projected upon the inner face of the carrier perimeter and identified with a clothing-pattern, as later described.

If, instead of using negative-film it should be found desirable to use opaque prints, as for the purpose of giving the person photographed occasion to observe the picture as to clarity of exposure, or otherwise, a projector for pictures on opaque material, of the usual character called in the stores "opaque projector," employing mirrors to transfer the image of projection to the screen, or, in the case of this invention, for projection to the inner face of the carrier perimeter, may be substituted in place of the lantern-slide projector shown.

The projector 9 is mounted on a carriage 11 slidable crosswise of the carrier in the slots 12 within the bearing 8. The thread of a nut 13 fast to the carriage 11 engages with the thread on a screw 14 journaled at 15, driven by miter gears 16, turned by the shaft 17 and crank 18 which is journaled at 19 and 19' on supports 7. Turning of the crank in one direction or the other moves the projector sidewise of the carrier in one direction or the other, and affords close sidewise adjustment of the image from the projector upon profiles about to be observed on the perimeter of the carrier 6.

The bearing cylinder 8 has a slot cut-out horizontally across from one side to the other through which the light rays pass to project the image to the inside of the perimeter of the carrier. The carrier-hub 6' has a series of openings 20 side to side and around its periphery to afford passage of light-rays for all essential positions of the image upon the perimeter.

The perimeter, preferably framed with metal, has its surface of a translucent material or material permeable by light through which the image from the projector is made visible from the outside, as at 21.

Upon this perimeter there are mounted a series of profiles 22, representing differentiated clothing-patterns in body-outlines of persons, graduated through a range of heights, builds, postures, and other characteristics of fit. On one part of the perimeter the profiles may consist of front views, and on another part side views. A part of the perimeter may be assigned to profiles representing patterns of fit for hats, shoes, etc.

Traced in the perimeter, circumferentially of the hub, are lines 23, a pair for each column of profiles. The distance of separation between the two lines of a pair bears the same mensural relation to the sizes of persons represented by the profiles as the length of the floor-gauge 4 bears to the size of the person photographed for fitting.

Each of the profiles is marked with a number, or letter, or symbol 24, representing a factory cutting-pattern. Cutting-patterns are so established at the clothing factories that the identification of the person photographed with a pattern-symbol will permit of making or choosing clothing that will fit him, and the accuracy of fit need be limited only by the scope of fit-characteristics, and the fineness of graduations, provided for in the profile series. The pattern provides for such exactness of fit or for such comfortable looseness, as is customary for the type of garment made.

In Figure 3 is shown a film 25 held in the hands to be registered manually with the profiles on the perimeter of the carrier 6. Preferably, in this alternative direct method of registering, a lamp is provided interiorly of the carrier to facilitate the registering. In this direct registering, pictures in a uniform size-scale may be substituted in place of profiles, and these may be made accessible on a transparent table-top with lamp below or in a file. The films 25 may be produced by duplication from the photograph of the person to be fitted, enlarged or reduced to the size-scale of the profiles or pictures. The duplicate may have a transparent background; enlargement contributes to accuracy of registering.

*Operation*

The positioning of the person to be photographed in relation to the floor-gauge, and in relation to the camera, and the production of the photographs, front and side views, have been observed in the foregoing text.

The films, one at a time, are inserted into the slide of the projector. The floor-gauge length in the image cast upon the perimeter is focused, by adjusting the lenses of the projector, so as to coincide with the distance of separation of any two paired lines 23 on the perimeter of the carrier. The size of the person represented by the image from the projector is thus brought into the size-scale represented by the profiles.

If, in the profile series, varying degrees of height are graded in columns, and varying degrees of stoutness are graded horizontally, the operator, sitting before the carrier 6, may turn the carrier to register the projected image with a profile of the closest height, and may turn the crank 18 to register the image with a profile of the closest stoutness at some part of the body such as the waist. Finding this, he may take its symbol as the first unit of the pattern-mark for the subject photographed. In another area of the perimeter is a series of profiles identified by symbols prefixed with the symbol just taken, all having the height and waist stoutness of the subject, but having differing characteristics of build and posture, as arms ranging from long to short, chests full to flat, shoulders square to drooping on front views, or erect to round on side views. The operator registers the image with the closest of these, and assigns the pattern-number from it to the subject. If this operation has been made first with the front view, the operator goes through the same procedure next with the side view, and he assigns the pattern-number of the profile which coincides most closely with the image. The final pattern-number assigned is that for the front view hyphenated with that for the side view.

This pattern number is identified at the clothing-factory with cutting-patterns to fit the subject photographed. In a system of assigning pattern-symbols before the articles of wear are made, production volumes may be gone into for required quantities of each pattern-number, to be shipped to the respective subjects of the photographs after being manufactured. In a system of producing clothing to stock, the pattern-number assigned through this system indicates the item to be taken from stock most closely to fit the person photographed.

Pattern-numbers for trousers according to leg-length and belt-location may be determined and assigned independently of characteristics above the waist. Hat-sizes may of course be determined independently of body characteristics. Foot-sizes for shoes may be determined by putting the floor-gauge at the junction of the floor with a wall, and having the subject lie on his back and bring his feet against the floor-gauge and wall, the photograph being taken from a prescribed height and distance. The pattern from such a photograph could be related to one of a side-view as in the side-views described in the foregoing text.

The invention is not limited to the use of a floor-gauge such as illustrated. An alternative floor-gauge not shown in drawings, consists of a sheet of cardboard imprinted with a marking or markings to show a gauge-dimension or terminal limits thereof and imprinted with footprints or heel-markings, prescribing foot-positions according to shoe-sizes, to bring the body into a desired position in relation to the gauge marking or markings.

As a variation, the gauge marking could be on a wall beside the person photographed.

The invention is not confined to the use of any gauge. The mensuration of the person to be fitted may be determined by a prescribed formula for taking the photograph, practiced conceivably in a professional's studio. The distance of the camera lens from the subject, the height of the lens from the floor, the focus, and the size of film used or photograph taken, may be standardized to produce photographs uniformly representing all subjects in the one size-scale. From such photographs, images in the size-scale of the profiles could be projected from a fixed setting of the projector lenses; or, in the manual registering practice, the original photograph in the size-scale of the profiles or pictures could be registered with the latter, or enlarged or reduced duplicates could be made for the purpose in the size-scale of the profiles or pictures.

I claim:

1. Apparatus for predetermining fits of clothing by photograph, comprising, means to produce at a substantially reduced scale a photograph of a person to be fitted, series of profiles representing clothing patterns each profile in a size-scale corresponding to that of the others, a carrier for the profiles, graduated and related groupings of the profiles upon the carrier with front views and side views in separate series, with graduations consecutively profile to profile in one characteristic of fit, graduations consecutively profile to profile in another characteristic of fit, and so on through a plurality of characteristics of fit, and means to relate the photograph to the profiles to determine the clothing-pattern most nearly fitting the said person.

2. Apparatus for predetermining fits of clothing by photograph, comprising, a gauge of definite measure located in relation to a person to be fitted, a camera and auxiliary devices to produce at a substantially reduced scale a photograph of the person and the gauge, a series of profiles representing differentiated clothing-patterns in a given size-scale, a carrier for the profiles having a surface permeable by light, a projector to project by light rays upon the surface and the profiles from the photograph an image in the size-scale of the profiles, and means to register the image with the profiles selectively to identify it with the profile most nearly representative of the said person's clothing-pattern.

3. Apparatus for predetermining fits of clothing by photograph, comprising, a strip of material definite in length located in relation to a person to be fitted, a camera and auxiliary devices to produce at a substantially reduced scale a photograph of the person and the material strip, a series of profiles representing clothing-patterns graduated in characteristics of fit, each profile in a size-scale corresponding to that of the others, a carrier for the profiles, a marking on the carrier to relate the size-scale of the profiles to that of the material strip, a means for producing and projecting upon the profiles an image from the photograph having the material strip reproduced therein in the size-scale of the said marking on the carrier, and means selectively to register the image with the profile most nearly representative of the said person's clothing-pattern.

4. Apparatus for predetermining fits of clothing by photograph comprising, a floor-gauge located in relation to a person to be fitted standing thereon, a scale-mark on the floor-gauge, foot-locating marks imprinted on the floor-gauge, a camera and auxiliary devices to produce at a substantially reduced scale a photograph of the person and the floor-gauge, a series of profiles in a given size-scale representing differentiated clothing-patterns, each profile accompanied by an identifying pattern-symbol, a carrier for the profiles, a projector to bring out from the photograph and the scale-mark reproduced thereon an image in the size-scale of the profile series and to project the image upon the carrier visibly in relation to the profiles, and means for moving the carrier and the projector selectively to bring into register with the said image one of the profiles closely corresponding to it, and to assign to the subject of the photograph the identifying pattern-symbol of the profile so selected.

5. Apparatus for predetermining fits of clothing by photograph, comprising, means to produce a photograph of a person to be fitted, a series of profiles representing differentiated clothing-patterns in a given size scale, a cylindrical carrier for the profiles rotatable upon a bearing and having translucent walls, an organized grouping of the profiles upon the translucent walls of the carrier, a projector within the carrier to project from the photograph upon the inside of the perimeter of the cylinder and visibly from the outside an image of the person to be fitted, a means to bring out the image to the size-scale of the profiles, and means to slide the projector lengthwise of the carrier to move the image from end to end of the translucent walls.

FREDERICK A. PURDY.

REFERENCES CITED

The following references are of record in the file of this patent:

UNITED STATES PATENTS

| Number | Name | Date |
| --- | --- | --- |
| 486,236 | Pierling | Nov. 15, 1892 |
| 752,617 | De Pue | Feb. 16, 1904 |
| 1,480,390 | Hartness | Jan. 8, 1924 |
| 2,006,774 | Ohlsson | July 2, 1935 |
| 2,061,378 | Henze et al. | Nov. 17, 1936 |
| 2,159,035 | McGrath | May 23, 1939 |
| 2,192,529 | Thomas | Mar. 5, 1940 |
| 2,563,451 | Booth | Aug. 7, 1951 |

FOREIGN PATENTS

| Number | Country | Date |
| --- | --- | --- |
| 572,717 | Germany | Jan. 20, 1934 |